(12) United States Patent  
Esswie et al.

(10) Patent No.: US 11,025,399 B2  
(45) Date of Patent: Jun. 1, 2021

(54) INTERFERENCE SUPPRESSION

(71) Applicant: NOKIA TECHNOLOGIES OY, Espoo (FI)

(72) Inventors: Ali Esswie, Aalborg (DK); Klaus Pedersen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 95 days.

(21) Appl. No.: 16/402,016

(22) Filed: May 2, 2019

(65) Prior Publication Data

US 2020/0351065 A1    Nov. 5, 2020

(51) Int. Cl.
| | |
|---|---|
| *H04L 5/00* | (2006.01) |
| *H04B 17/336* | (2015.01) |
| *H04B 7/0413* | (2017.01) |
| *H04B 7/06* | (2006.01) |
| *H04L 5/14* | (2006.01) |
| *H04W 72/04* | (2009.01) |

(Continued)

(52) U.S. Cl.
CPC ......... *H04L 5/0092* (2013.01); *H04B 7/0413* (2013.01); *H04B 7/0639* (2013.01); *H04B 17/336* (2015.01); *H04L 5/1469* (2013.01); *H04W 72/0446* (2013.01); *H04W 72/1231* (2013.01)

(58) Field of Classification Search
CPC ... H04L 5/0092; H04L 5/1469; H04B 17/336; H04B 7/0413; H04B 7/0639; H04W 72/0446; H04W 72/1231
See application file for complete search history.

(56) References Cited

U.S. PATENT DOCUMENTS 8,862,168 B2 * 10/2014 Li ........................ H04J 11/0036  
455/501  
10,608,856 B2 * 3/2020 Papasakellariou .... H04L 27/261  
(Continued)

FOREIGN PATENT DOCUMENTS

WO    2013/165283 A1    11/2013

OTHER PUBLICATIONS

Tavares et al, "Interference-Robust Air Interface for 5G Ultra-dense Small Cells", Springer Science+Business Media New York 2015 (Year: 2015).*

(Continued)

*Primary Examiner* — Jenee Holland  
(74) *Attorney, Agent, or Firm* — Squire Patton Boggs (US) LLP

(57) ABSTRACT

Various communication systems may benefit from improved reduction of cross link interference. For example, certain embodiments may benefit from cross link interference suppression. A method, in certain embodiments, may include receiving, by a first network entity, at least one downlink precoder map from a second network entity over at least one interface. The method may also include estimating, by the first network entity, at least one basis of at least one common spatial sub-space associated with at least one, or all, identified BS-BS CLI source. In addition, the method may include for each reception associated with the first network entity, spatially projecting, by the first network entity, at least one interference rejection combining estimated interference covariance matrix into at least one orthogonal projector sub-space.

30 Claims, 18 Drawing Sheets

(51) Int. Cl.
*H04W 72/12* (2009.01)
*H04J 11/00* (2006.01)

(56) References Cited

U.S. PATENT DOCUMENTS

| | | | | |
|---|---|---|---|---|
| 2003/0142640 | A1* | 7/2003 | Pajukoski | H04W 16/14 370/321 |
| 2008/0112517 | A1* | 5/2008 | Parts | H04B 7/0842 375/346 |
| 2010/0104037 | A1* | 4/2010 | Jongren | H04L 1/0631 375/260 |
| 2012/0108194 | A1* | 5/2012 | Lindqvist | H04B 7/0871 455/296 |
| 2012/0243502 | A1* | 9/2012 | Lindqvist | H04J 11/0046 370/330 |
| 2013/0051382 | A1* | 2/2013 | Derham | H04W 72/085 370/345 |
| 2013/0237261 | A1* | 9/2013 | Bazzi | H04B 7/0456 455/501 |
| 2013/0242885 | A1* | 9/2013 | Zhu | H04L 1/1812 370/329 |
| 2014/0160949 | A1* | 6/2014 | Clausen | H04L 5/0073 370/252 |
| 2014/0294125 | A1* | 10/2014 | Sagae | H04L 25/021 375/340 |
| 2016/0344459 | A1* | 11/2016 | Chen | H04B 7/0854 |
| 2017/0324462 | A1* | 11/2017 | Chen | H04B 7/0868 |
| 2018/0034532 | A1* | 2/2018 | Wu | H04B 7/08 |
| 2018/0110015 | A1* | 4/2018 | Huh | H04W 52/243 |
| 2018/0351591 | A1* | 12/2018 | Fakoorian | H04B 1/1027 |
| 2019/0098663 | A1* | 3/2019 | Zhang | H04W 74/0808 |
| 2019/0110317 | A1* | 4/2019 | Zhang | H04W 74/0808 |
| 2019/0342051 | A1* | 11/2019 | Sano | H04L 5/0094 |
| 2020/0106593 | A1* | 4/2020 | Wu | H04L 5/14 |
| 2020/0112420 | A1* | 4/2020 | Xu | H04W 88/10 |
| 2020/0169435 | A1* | 5/2020 | Kang | H04L 5/0073 |

OTHER PUBLICATIONS

Esswie, et al. "Cross Link Interference Suppression by Orthogonal Projector in 5G Dynamic-TDD URLLC System", Department of Electronic Systems, Aalborg University, Denmark, 4 pgs.

3GPP TS 38.423 V15.3.0, Technical Specification Group Radio Access Network; NG-RAN; Xn application protocol (XnAP) (Release 15), 294 pgs.

3GPP TS 38.470 V15.5.0, Technical Specification Group Radio Access Network; NG-RAN; F1 general aspects and principles (Release 15), 13 pgs.

3GPP TS 38.473 V15.5.0, Technical Specification Group Radio Access Network; NG-RAN; F1 application protocol (F1AP) (Release 15), 198 pgs.

Ali. A. Esswie et al., "Quasi-Dynamic Frame Coordination for Ultra-Reliability and Low-Latency in 5G TDD Systems," in Proc. IEEE ICC 2019.

A. Lukowa et al., "Performance of strong interference cancellation in flexible UL/DL TDD systems using coordinated muting, scheduling and rate allocation," 2016 IEEE Wireless Communications and Networking Conference, Doha, 2016, pp. 1-7.

V. Venkatasubramanian et al., "On the performance gain of flexible UL/DL TDD with centralized and decentralized resource allocation in dense 5G deployments," 2014 IEEE 25th Annual International Symposium on Personal, Indoor, and Mobile Radio Communication (PIMRC), Washington, DC, 2014, pp. 1840-1845.

K. Lee et al., "Aligned Reverse Frame Structure for Interference Mitigation in Dynamic TDD Systems," in IEEE Transactions on Wireless Communications, vol. 16, No. 10, pp. 6967-6978, Oct. 2017.

International Search Report and Written Opinion corresponding to International Patent Application No. PCT/EP2020/062066, dated Oct. 28, 2020.

Nokia et al., "Dynamic TDD Interference Mitigation Concepts in NR", 3GPP TSG-RAN WG1#NR, Spokane, USA, Jan. 16-20, 2017, R1-1701146, 6 pages.

Esswie et al., "Cross-Link Interference Suppression by Orthogonal Projector for 5G Dynamic TDD URLLC Systems", Arxiv.org, Cornell University Library, Ithaca, NY, Jan. 16, 2020, XP081579982, 6 pages.

Esswie et al., "Inter-Cell Radio Frame Coordination Scheme Based on Sliding Codebook for 5G TDD Systems", Arxiv.org, Cornell University Library, Ithaca, NY, Feb. 8, 2019, XP081026789, 6 pages.

* cited by examiner

FIG. 6
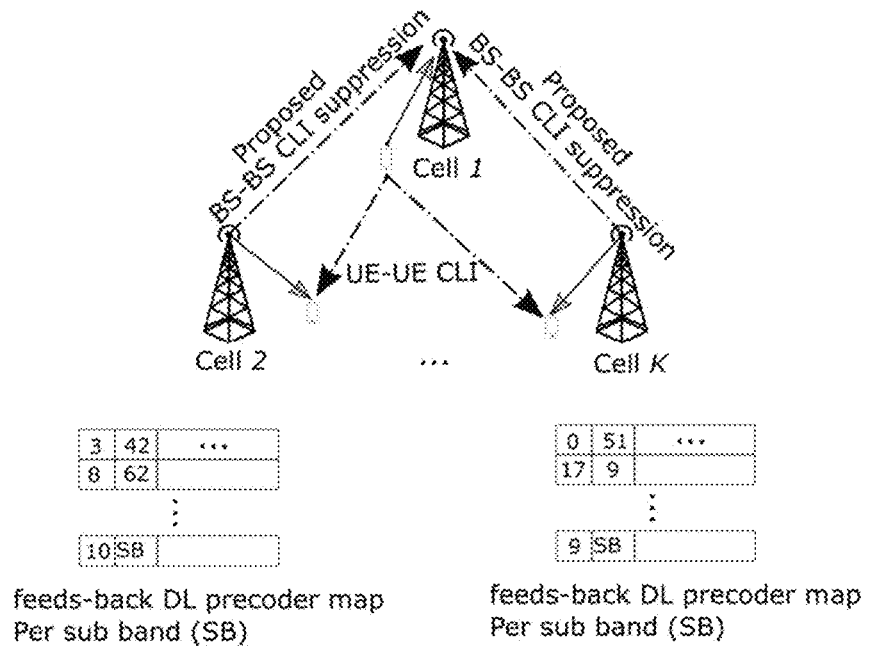
(a)
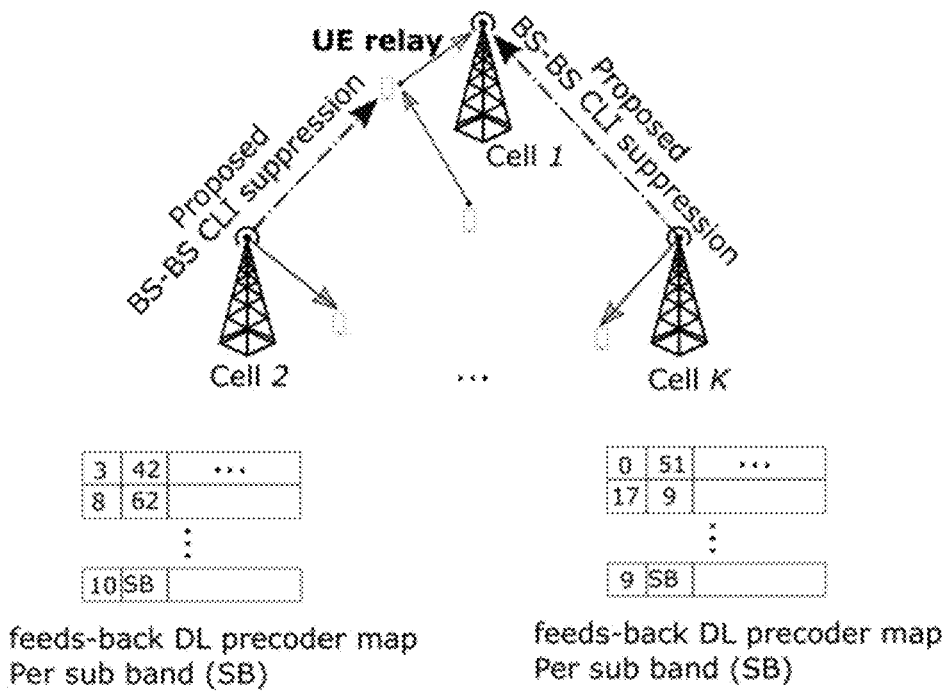
(b)

FIG. 9

| Parameter | Value |
|---|---|
| Environment | 3GPP-UMA, 7 BSs, 21 cells, 500 ISD |
| Channel bandwidth & duplexing | 10 MHz, dynamic TDD |
| Antenna setup | BS: ULA 8 × 1 – UE: ULA 2 × 1 |
| Receiver | Standard LMMSE-IRC |
| Sub-carrier spacing | 30 KHz |
| TTI setup | short TTI: 4-OFDM symbols |
| TDD mode | Synchronized across all BSs |
| RFC update periodicity | A single radio frame = 10 subframes, 10 ms |
| Link direction selection criteria | Traffic based |
| Subframe misalignment threshold | 3 |
| Traffic model | FTP3 with Poisson point arrival (UL and DL) |
| Packet size (file size) $Z$ | (50 Bytes * 8) bits |
| Arrival rate $\lambda$ | DL: 333 packet/sec<br>UL: 166 packet/sec |
| Average users per cell $K$ | 20 average users/cell, uniformly distributed |
| Traffic ratio | DL:UL = 2:1 |
| Average offered load/ cell | 4, 5, 6, and 7 Mbps |

FIG. 12

| Offered load | CLI-free TDD | | Non-coordinated TDD | | H-RFC [3, 4] | | Proposed invention | |
|---|---|---|---|---|---|---|---|---|
| | DL | UL | DL | UL | DL | UL | DL | UL |
| 4 Mbps | 7.15 | 14.76 | 8.47 | 105.34 | 7.75 | 23.12 | 7.36 | 17.1 |
| 5 Mbps | 8.04 | 15.17 | 1063 | 6063 | 14.24 | 203.6 | 8.43 | 18.0 |
| 6 Mbps | 11.04 | 16.29 | 7394 | 18390 | 3159 | 12540 | 11.47 | 19.32 |
| 7 Mbps | 17.28 | 18.23 | 12480 | 25610 | 6575 | 19470 | 19.8 | 23.07 |

Figure 6.1-1: Overall architecture

INTERFERENCE SUPPRESSION

BACKGROUND

Field

Various communication systems may benefit from improved reduction of cross link interference. For example, certain embodiments may benefit from cross link interference suppression.

Description of the Related Art

5th generation (5G) mobile communication networks support both frequency division duplexing (FDD) and time division duplexing (TDD) modes, with TDD providing improved availability of unpaired spectrum for new radio (NR) deployments. In addition, TDD may be a critical component to support features in massive multi-antenna communications over 5G NR, for example, massive multi-input multi-output (MIMO), beamforming, and adaptive antenna systems due to channel reciprocity.

SUMMARY

In accordance with some embodiments, a method may include receiving, by a first network entity, at least one downlink precoder map from a second network entity over at least one interface. The method may further include estimating, by the first network entity, at least one basis of at least one common spatial sub-space associated with at least one identified CLI source. The method may further include, for each reception associated with the first network entity, spatially projecting, by the first network entity, at least one interference rejection combining (IRC) estimated interference covariance matrix into at least one orthogonal projector sub-space.

In accordance with some embodiments, an apparatus may include means for receiving at least one downlink precoder map from a network entity over at least one interface. The apparatus may further include means for estimating at least one basis of at least one common spatial sub-space associated with at least one identified CLI sources. The apparatus may further include means, for each reception associated with the apparatus, spatially projecting at least one interference rejection combining (IRC) estimated interference covariance matrix into at least one orthogonal projector sub-space.

In accordance with some embodiments, an apparatus may include at least one processor and at least one memory including computer program code. The at least one memory and the computer program code may be configured to, with the at least one processor, cause the apparatus to at least receive at least one downlink precoder map from a network entity over at least one interface. The at least one memory and the computer program code may be further configured to, with the at least one processor, cause the apparatus to at least estimate at least one basis of at least one common spatial sub-space associated with at least one identified CLI sources. The at least one memory and the computer program code may be further configured to, with the at least one processor, cause the apparatus to at least, for each reception associated with the apparatus, spatially projecting at least one interference rejection combining (IRC) estimated interference covariance matrix into at least one orthogonal projector sub-space.

In accordance with some embodiments, a non-transitory computer readable medium may be encoded with instructions that may, when executed in hardware, perform a method. The method may receive at least one downlink precoder map from a network entity over at least one interface. The method may further estimate at least one basis of at least one common spatial sub-space associated with at least one identified CLI sources. The method may further, for each associated reception, spatially projecting at least one interference rejection combining (IRC) estimated interference covariance matrix into at least one orthogonal projector sub-space.

In accordance with some embodiments, a computer program product may perform a method. The method may receive at least one downlink precoder map from a network entity over at least one interface. The method may further estimate at least one basis of at least one common spatial sub-space associated with at least one identified CLI sources. The method may further, for each associated reception, spatially projecting at least one interference rejection combining (IRC) estimated interference covariance matrix into at least one orthogonal projector sub-space.

In accordance with some embodiments, an apparatus may include circuitry configured to receive at least one downlink precoder map from a network entity over at least one interface. The circuitry may further estimate at least one basis of at least one common spatial sub-space associated with at least one identified CLI sources. The circuitry may further, for each associated reception, spatially project at least one interference rejection combining (IRC) estimated interference covariance matrix into at least one orthogonal projector sub-space.

BRIEF DESCRIPTION OF THE DRAWINGS

For proper understanding of the invention, reference should be made to the accompanying drawings, wherein:

FIG. 6 illustrates an example of BS-BS CLI suppression and precoder map feedback according to certain embodiments.

FIG. 9 illustrates an example of simulation parameters according to certain embodiments.

FIG. 12 illustrates a table of URLLC outage latency at $10^{-5}$ probability according to certain embodiments.

DETAILED DESCRIPTION

Figure 1:
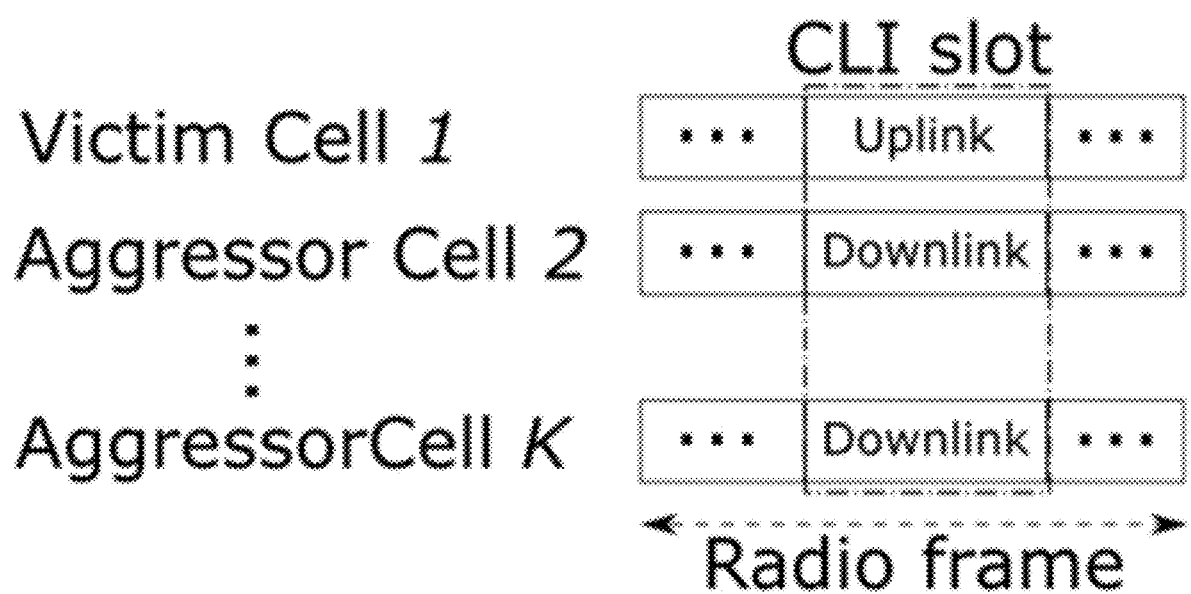
FIG. 1 illustrates an example of DL-to-UL CLI occurrences in dynamic TDD according to certain embodiments.

Among other requirements, 5G NR should support a large number of applications with varying quality of service (QoS) requirements, causing a wide variety of asymmetric downlink (DL) and uplink (UL) traffic demands. TDD operation mode is a key factor in achieving this since the radio frame configuration (RFC) of each base station (BS) may be changed over time to adapt to instantaneous traffic demands. For example, each BS may independently change its DL-to-UL slots/symbols ratio within a radio frame based upon its traffic ratio. However, such an operation may introduce an additional type of inter-cell cross-link interference (CLI), such as UL-to-DL or DL-to-UL. This may include CLI between user equipment (UE-UE) and/or between base stations (BS-BS). Furthermore, ultra-reliable and low latency communications (URLLC) is a major component of 5G NR, providing an outage latency of one or several milliseconds with an outage probability of $10^{-5}$. Such URLLC latency and reliability are extremely challenging to achieve with dynamic TDD due to the UL/DL switching time and CLI. While UL/DL switching time may be minimized with the mini-slot transmissions of the 5G NR, CLI remains an open challenge.

In macro deployments, CLI is a critical issue, requiring mitigation on a pre-receiver or post-receiver basis. For example, due to the power imbalance between the DL and UL transmissions in macro setups, DL-heavy BSs may interfere with the transmissions of the adjacent UL-heavy BSs, leading to a significantly degraded UL performance. Thus, CLI, particularly BS-BS CLI, is considered a major hindrance for performance of 5G dynamic TDD macro systems. Coordination schemes among BSs have been developed to counteract the CLI; however, these frequently are only effective over certain CLI ranges, and otherwise fail to mitigate CLI. In addition, these coordination schemes may require extensive CLI user measurements, highly complex implementation, and/or significant signaling overhead.

Some techniques have been suggested for coordinating schemes of fully dynamic TDD systems. For example, one technique configures periodicity and numerology, such as subcarrier spacing and cyclic prefix length. A list may contain multiple entities of information indicating that slots within a periodicity are configured, as well as a UL region indication being configured for each slot, such as all DL, all UL, a number of DL symbols, and/or a number of UL symbols in a slot.

Another example includes a DL-to-UL CLI cancellation method using full packet exchange. The DL-heavy BSs signals adjacent UL-heavy BSs with DL data payloads, precoding information, timing information, modulation and coding information, and scheduling decisions. These UL-heavy BSs may cancel the DL-to-UL CLI, improving UL and DL capacity, but with significant control signalling overhead over the $X_n$ interface.

Other techniques propose an $X_n$-based coordination scheme to avoid the UE-UE CLI occurrence by pre-cancelling the more critical BS-BS CLI on a best-effort basis. This may lead to a significantly enhanced capacity and latency performance, but only within a limited BS-BS CLI bound, such as under a DL-heavy traffic assumption. Thus, with strong BS-BS CLI, the URLLC latency and capacity performance may exponentially degrade due to the excessive UL retransmissions.

Some proposals may relate to a network-based UL-DL coordination scheme. Here, base stations may be associated with a common RFC across the entire cluster, such as static TDD. When a base station demands an RFC change, it may signal all base stations within the cluster by an RFC change request. If all base stations agree, then the request is accepted, and all base stations may switch to the updated RFC, which may still be in a static TDD mode. If at least one base station rejects such a request, the requesting base station only changes to the desired RFC, and all base stations in the cluster may periodically start to monitor the CLI measurements. If the detected CLI levels exceed a pre-defined threshold, all base stations fall back to static TDD with the common RFC. Thus, CLI levels should be limited at all times. However, with a significantly reduced RFC flexibility, large signalling overhead across an $X_n$ interface occurs, as well as the need for periodic CLI user measurements over the radio control channels.

Additional proposals may relate to a hybrid TDD coordination scheme, where BSs dynamically switch among static and dynamic TDD modes based on the detected CLI level. If the CLI level passes a threshold, all BSs switch back to the same static TDD RFC. Thus, the CLI is always minimized, but with extremely limited RFC flexibility in addition to the requirement of high quality CLI user measurements.

Some techniques may include coordinated cell muting and rate allocation between all BSs in a cluster to eliminate the major CLI aggressor BSs/PRBs, but at the expense of capacity regions. For example, some BSs may be muted over several subframes, requiring a significant amount of control overhead to globally publicise the BS individual scheduling decisions across the cluster.

Finally, a coordinated aligned reverse frame structure has been proposed where BSs are grouped in pairs. Each BS may select an RFC which needs to be fully reversed to the other BS in this pair, biasing the dynamic TDD system to more DL-to-UL CLI occurrences than the UL-to-DL ones. A coordinated DL-to-UL CLI cancellation may then be adopted at all BSs using advanced non-linear receivers and sophisticated coordination. However, the requirement of the fully-reversed frame structures of each two adjacent BSs may set a critical restriction on the TDD RFC flexibility, for example, two adjacent BSs may not originally select exactly the same RFC but with reverse order.

With a standard dynamic TDD system model over 5G NR, each BS may independently select its RFC based on its current traffic demands. A RFC may be composed from 10 subframes, with each having a 1-ms duration. Each RFC may be divided into two equally-sized half-frames of five subframes, each with half-frame-0 consisting of subframes 0-4 and half-frame-1 consisting of subframes 5-9. A subframe consists of 14 OFDM symbols for cases with a normal cyclic prefix, while it equals only 12 OFDM symbols for the case with extended cyclic prefixes and subcarrier spacing of 60 kHz. The number of slots per subframe/radio frame may depend on the subcarrier spacing. For 15 kHz subcarrier spacing, there may be one slot per subframe; for 30 kHz, there may be two slots per subframe; for 60 kHz, there are four slots per subframe, and so forth. A large number of possible slot formats may be defined in 3GPP TS 38.213, where "D" indicates downlink symbol, "U" indicates uplink symbol, and "F" is flexible. Hence, "F" could refer to muting or be used for downlink or uplink transmission. As an example, slot format 0 and 1 may correspond to downlink-only and uplink-only slots, respectively. Slot format 36 may contain first three downlink transmission symbols, followed by "F" (which could be set to mute for guard period), and ten uplink transmission symbols. As per 3GPP TS 38.213, the gNB may dynamically inform the UEs of the used slot format.

The flexible frame structure of 5G NR may allow for both short and long transmission time intervals (TTIs). Thus, it is applicable to both enhanced mobile broadband (eMBB) and ultra-reliable low-latency communication (URLLC) QoS classes. eMBB is facilitated by allowing both mini-slot transmission of, for example, 2- or 4-symbols to/from particular users, and full slot transmissions, or TTIs of aggregated slots.

If base stations do not use exactly the same RFC, adjacent base stations may experience different transmission directions over several symbols/slots, causing potentially severe CLI, as shown by the example in FIG. 1. Accordingly, the lower-power UL transmissions may be severely degraded due to the strong CLI resulting from adjacent larger-power DL transmissions. As a result, the achievable UL capacity may exhibit a significant loss, leading to more buffered UL traffic in those victim BSs. Hence, these base stations may be dictated by new and buffered UL traffic leading to a limited DL capacity and highly degraded overall spectral efficiency as a consequence.

Figure 2:
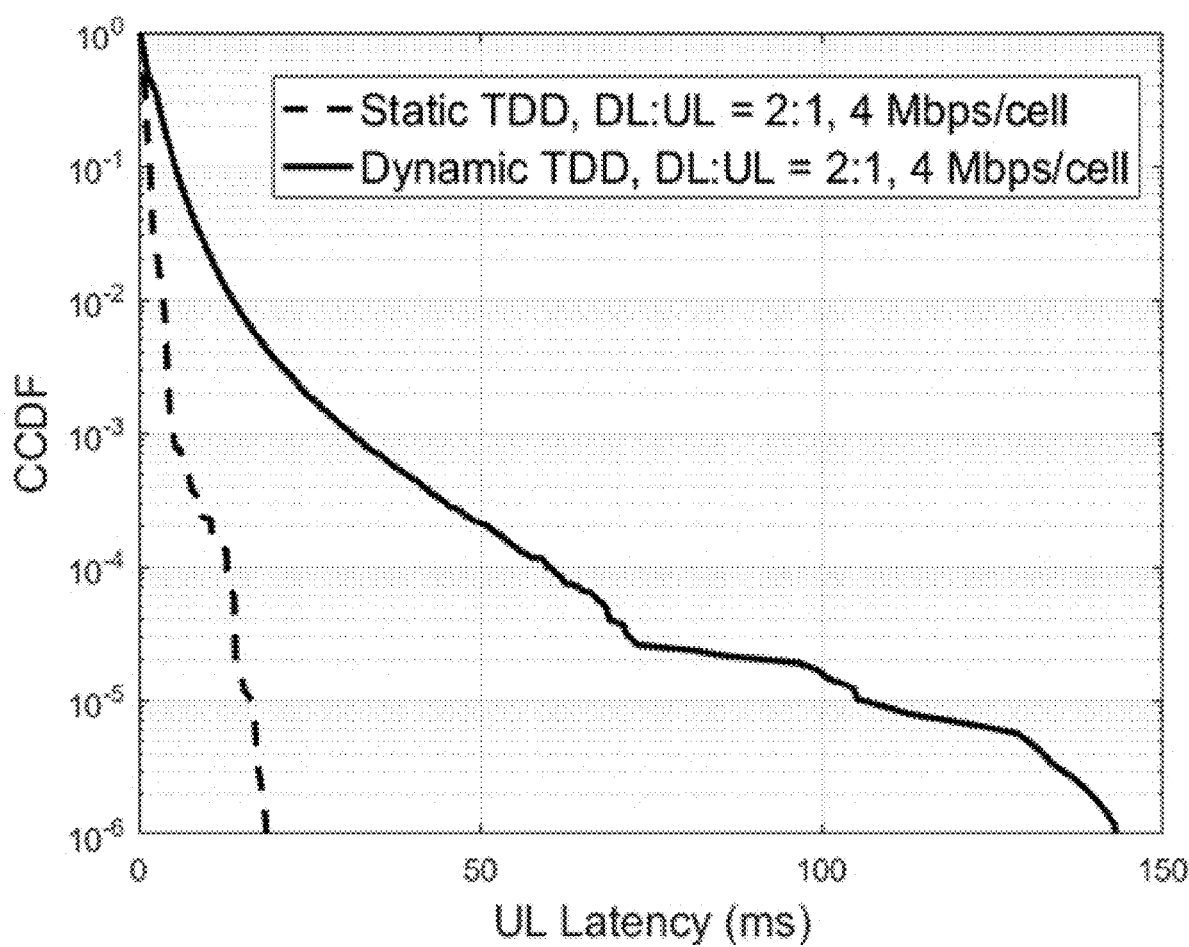
FIG. 2 illustrates an example of URLLC outage latency of static and dynamic TDD according to certain embodiments.

FIG. 2 illustrates the complementary cumulative density function (CCDF) of the URLLC one-way latency, under the static and fully dynamic (non-coordinated) TDD setups, for a DL:UL offered traffic ratio as 2:1 (DL-heavy) and total of 4 Mbps/cell of offered load. At the $10^{-5}$ URLLC outage probability, the static TDD setup provides improved URLLC latency compared with the dynamic TDD case, i.e., 16.2 ms compared to 105.4 ms with the dynamic TDD. This may be due to critical DL-to-UL, i.e., BS-BS, CLI that is significantly degrading the adjacent UL decoding ability, by higher-power DL interfering transmissions. Accordingly, the transmitted UL traffic may be accumulated in the scheduling buffers for further retransmissions. As a result, the system may be dictated by the new and buffered UL traffic, resulting in suboptimal UL and DL latency and capacity performance.

Figure 3:
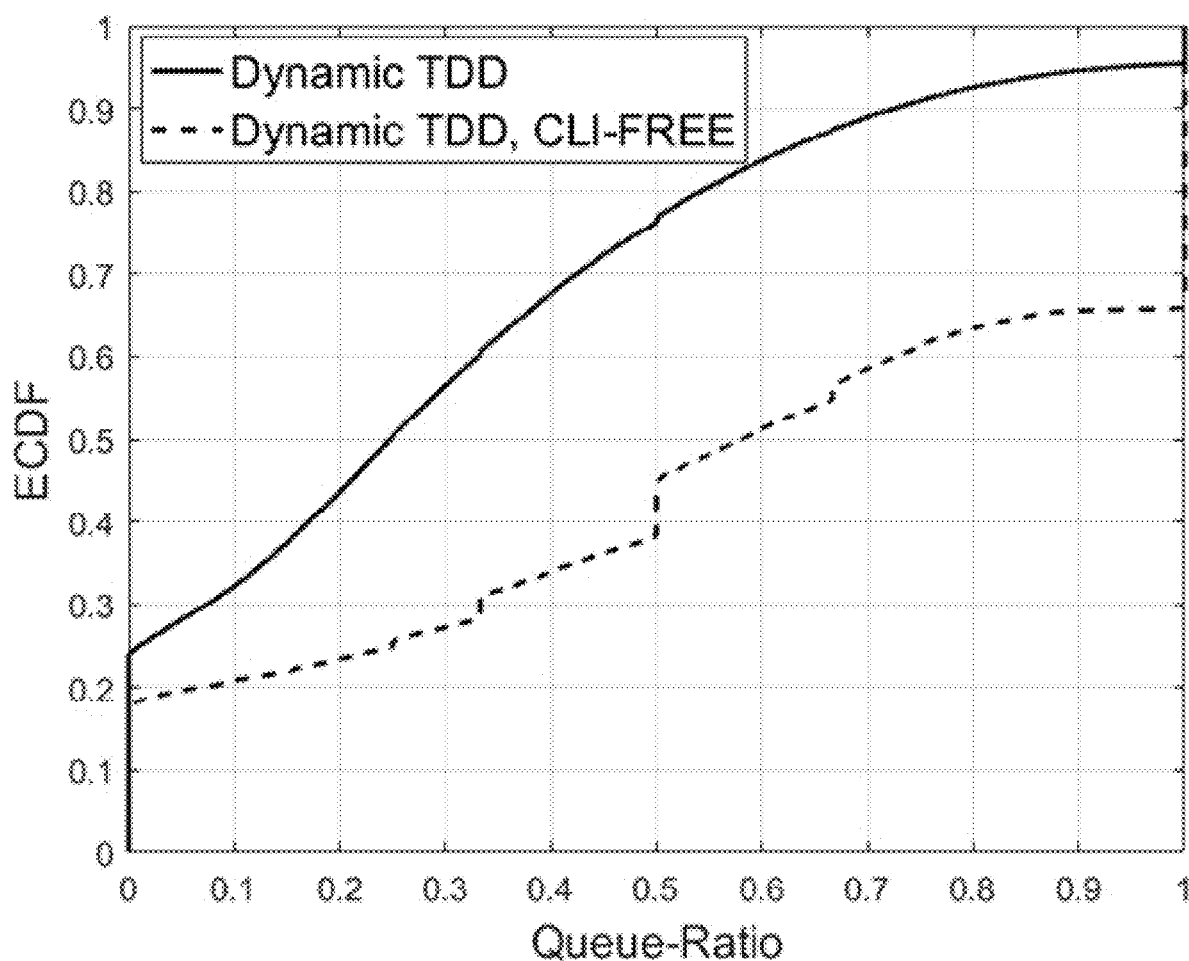
FIG. 3 illustrates an example of buffered traffic ratios of dynamic TDD according to certain embodiments.

To further highlight such UL buffering problem, FIG. 3 presents the average buffering queue ratio, which denotes the ratio of the DL buffered traffic to the total UL and DL buffered traffic $$\left(\frac{DL}{DL+UL}\right),$$

for the fully dynamic TDD setup under two conditions: a) non-coordinated with no CLI suppression, and b) coordinated with theoretically perfect CLI suppression, i.e., CLI=0. For the non-coordinated case, the queue ratio is fairly small, such as at the $50^{th}$ percentile, it is 0.248, which denotes that the average amount of buffered UL traffic is 3× times the buffered DL traffic, despite the fact that the offered DL traffic is 2× times the offered UL traffic. This is because the UL traffic almost get successfully decoded after several retransmissions due to the strong BS-BS CLI. Such behaviour is vanished when the CLI is theoretically assumed to be perfectly cancelled, i.e., CLI-free.

Certain embodiments described herein may have various benefits and/or advantages to overcome the disadvantages described above by enabling coordination between base stations to manage CLI. For example, certain embodiments may provide a near-optimal TDD coordination scheme to suppress critical BS-BS CLI, leading to a significantly improved UL capacity and latency performance. As a result, a reduction of 143.0% in URLLC outage latency and 139.3% per-packet throughput gain as compared to non-coordinated TDD deployment. Furthermore, a consistent and reliable CLI suppression ability may be provided regardless of the amount of the offered load and the DL-to-UL traffic ratio, respectively, without requiring periodic CLI user measurements.

Certain embodiments may result in improved reliable BS-BS CLI suppression ability independently from an offered load level and DL. Some embodiments may also provide robust and reliable capacity performance in both UL and DL directions regardless of the offered traffic loads in both directions and potential CLI levels. Furthermore, various embodiments require low coordination complexity with limited signalling overhead over the Xn/F1 interface without periodic user CLI measurements, leading to improvements in computer-related technology.

Figure 4:
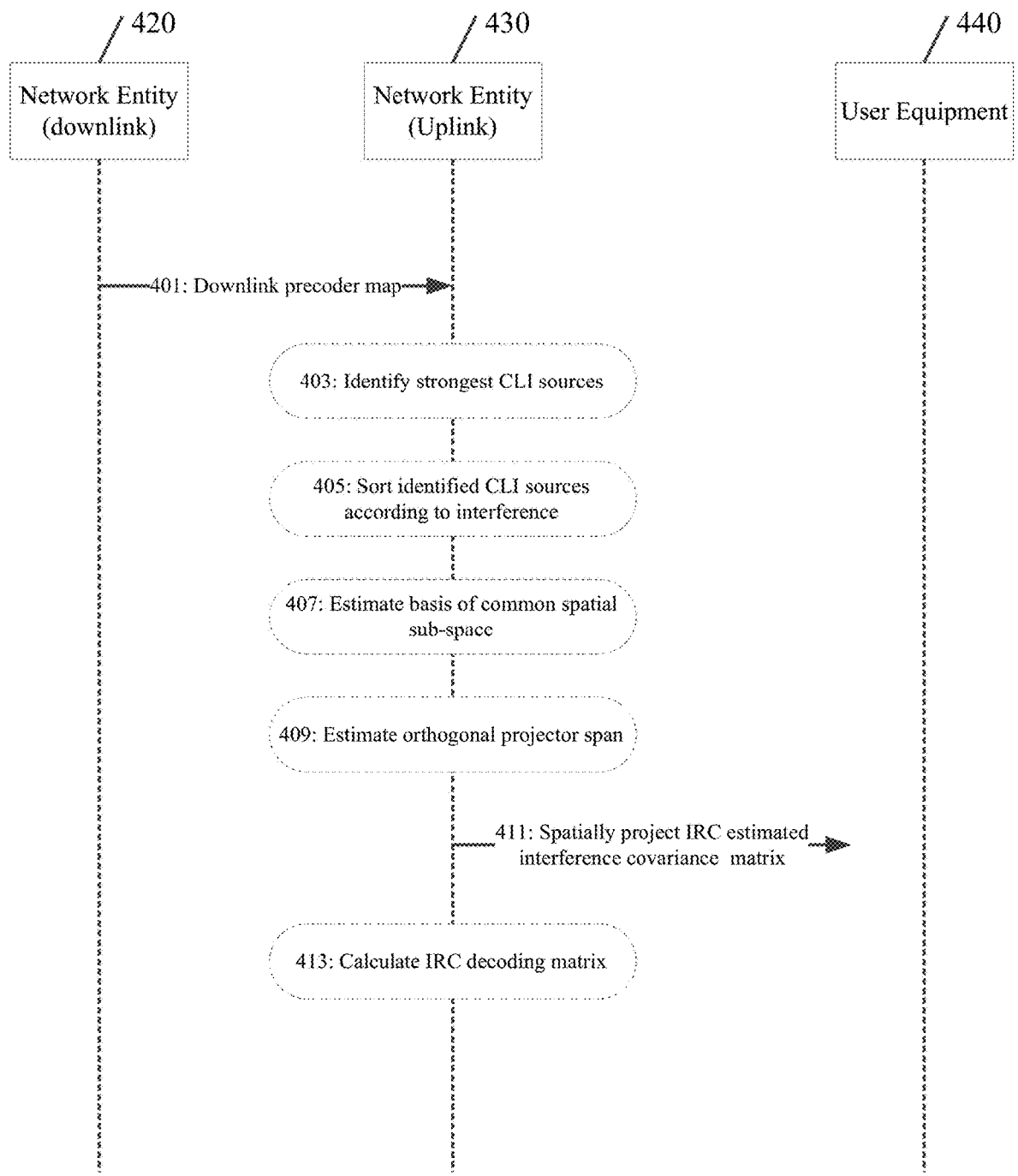
FIG. 4 illustrates an example of a signal flow diagram according to certain embodiments.

FIG. 4 illustrates a signaling diagram according to some embodiments. In step 401, NE 420, which may be similar to NE 1610 in FIG. 16, may transmit at least one downlink precoder map to NE 430, which may also be similar to NE 1610 in FIG. 16. A downlink precoder map may at least one wide-band or sub-band precoder index configured to be adopted by at least one scheduled downlink user during at least one upcoming mini-slot/slot transmission. At least one user-specific precoding matric index (PMIs) may be relayed between at least one base stations. In addition, NE 420 and/or NE 430 may be in communication with UE 440, which may be similar to UE 1620 in FIG. 16. NE 420 and/or NE 430 may be associated with at least one BS-BS CLI symbol/slot within at least one current RFC and/or may be adjacent base stations. Additionally, NE 420 may be in a DL mode and/or NE 430 may be in an uplink mode. The at least one DL precoder map may be transmitted over at least one $X_n$ interface. In some embodiments, the at least one DL precoder map may comprise at least one vector of bits configured to indicate at least one selected sub-band/wide-band pre-coding matrix index (PMI) associated with at least one schedule DL user over the associated slot. The at least one selected sub-band/wideband PMI may be configured to be used by at least one scheduled user during a next DL symbol of the DL base stations, as illustrated in FIG. 6(a).

In some embodiments, NE 420 may be similar to a centralized unit (CU) and/or NE 430 may be similar to a distributed unit (DU). Thus, NE 420 may transmit the at least one downlink precoder map to NE 430 over at least one $X_n$-C interface configured to coordinate at least one $X_n$AP procedure, as defined in 3GPP TS 38.423, herein incorporated in its entirety, and/or an NG interface towards at least one 5G core network (5GC).

In some embodiments, the 5G NR architecture may be configured to allow C-RAN implementation associated with at least one CU and/or at least one DU. The CU-DU configuration may be associated with at least one E1 interface between at least one control plane and at least one user plane in the CU, as described in 3GPP TS 38.460 and/or TS 38.463. Additionally or alternatively, the CU-DU configuration may be associated with at least one F1 interface between at least one CU and at least one DU, as described in 3GPP TS 38.470 and/or TS 38.473, herein incorporated in their entirety.

Figure 16:
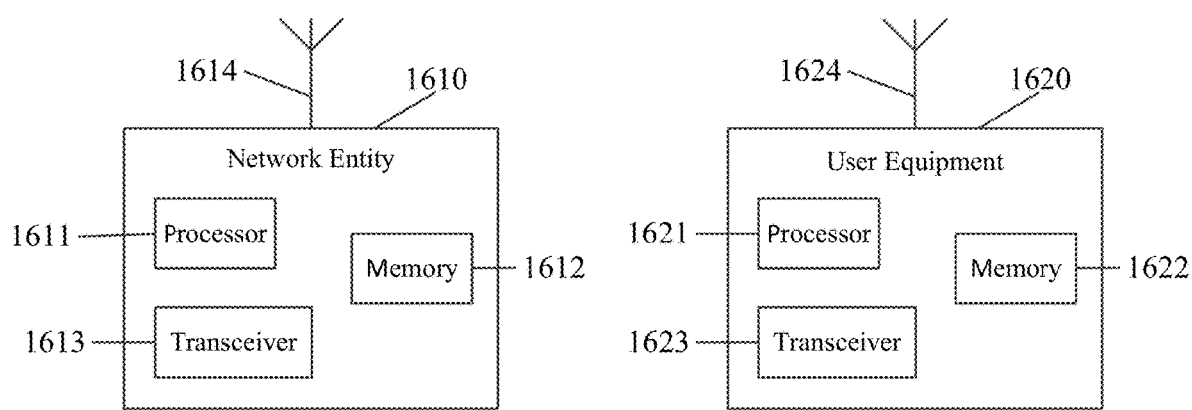
FIG. 16 illustrates an example of a system according to certain embodiments.

In some embodiments, where NE 430 is, or is similar to, UE 440, NE 430 may directly communicate with at least one other user equipment, such as UE 1620 in FIG. 16, and/or with assistance from a network. For example, NE 430 may act as a relay UE, serving as a UL BS for at least one adjacent UE. In certain embodiments, the at least one adjacent UE may be affected by adjacent DL transmissions from neighboring base stations, as illustrated in FIG. 6(*b*). Thus, downlink precoder signaling may be performed over at least one radio interface from NE 420 to NE 430.

Figure 10:
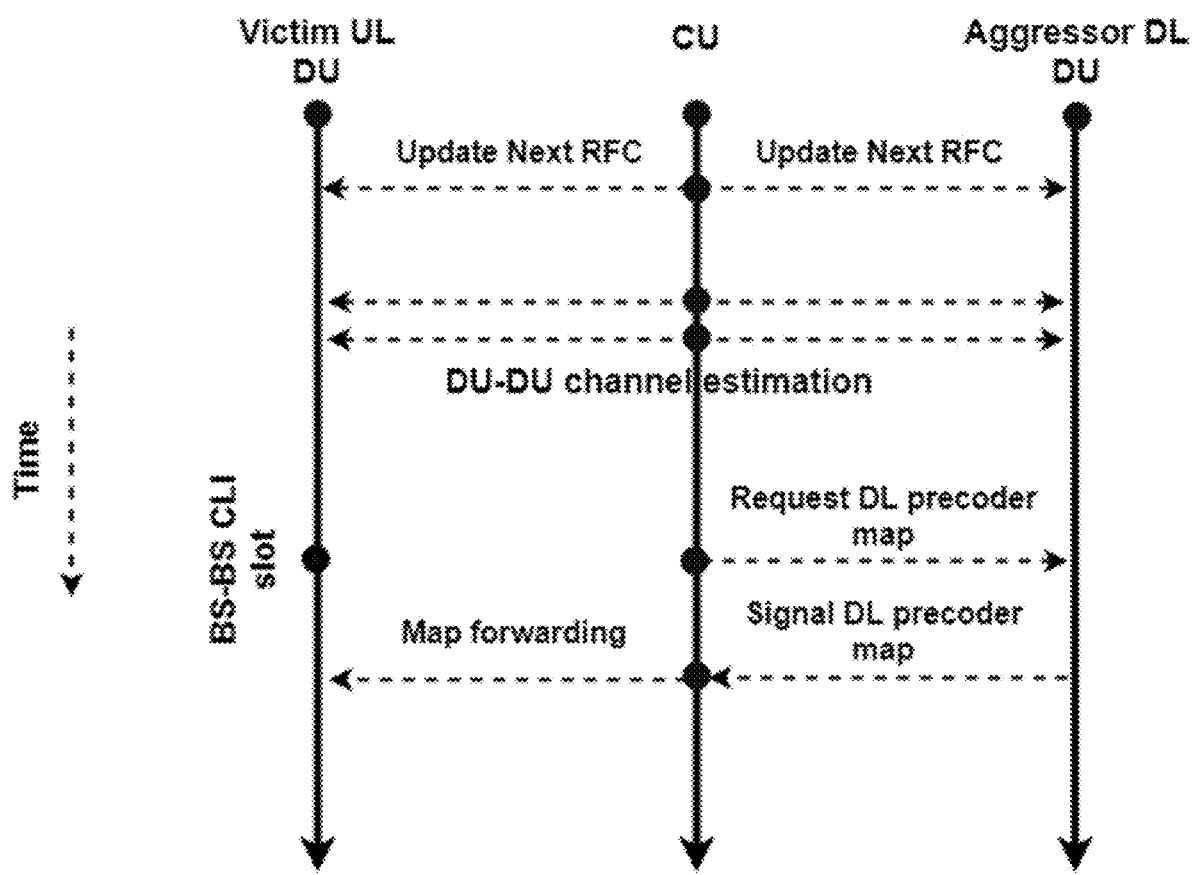
FIG. 10 illustrates an example of a timing diagram of signaling under a CU/DU structure according to certain embodiments.

In various embodiments, the at least one CU may be configured to serve as a master and/or the at least one DU may be configured to serve as a slave, as illustrated in FIG. 10. The at least one downlink precoder map may be transmitted according to at least one F1 control plane signaling path, such as F1-C. In response, the at least one CU may determine at least one RFC associated with the at least one DU, and transmit the at least one determined RCC to the at least one DU. The CU may be configured to identify at least one slot/symbol associated with DU-DU CLI.

For each instance of DU-DU CLI, the CU may transmit at least one request to at least one interfering DU to report at least one used precoder map. In response, the CU may forward the at least one reported used precoder map to at least one interfered DU. The at least one interfered DU may, according to the received at least one used precoder map, adjust at least one parameter to reduce DU-DU CLI interference.

In some embodiments, the CU may coordinate with at least one DU to perform at least one DU-DU radio channel measurement associated with low-offered traffic and/or conditions exceeding at least one interference threshold associated with at least one channel estimation task.

In step 403, in response to receiving the at least one DL precoder map, NE 430 may identify at least one BS-BS CLI source associated with CLI exceeding at least one predefined CLI source threshold. The at least one identified BS-BS CLI source may be scaled by at least one channel between at least one DL and at least one UL NE. In some embodiments, the at least one channel may be estimated according to at least one periodicity, which may be associated with at least one static property exceeding at least one predefined static property threshold.

In step 405, NE 430 may sort the at least one identified BS-BS CLI source in an order, such as descending order or ascending order, according to the CLI associated with each BS-BS CLI source. In some embodiments, NE 430 may consider only the $M_r-1$ BS-BS CLI sources, where $M_r$ is a number of UE antennas.

In step 407, NE 430 may estimate at least one basis of at least one common spatial sub-space associated with at least one, or all, identified $N_t-1$ BS-BS CLI sources. For example, NE 430 may perform the estimation according to:

$$\beta_k = \begin{cases} J_1, k = 1 \\ J_k - \sum_{j=1}^{k-1} proj_{\beta_j}(J_k), 2 \leq k \leq N_t - 1 \end{cases}$$

$$proj_{\beta_k}(J_k) = \left(\frac{J_k \cdot \beta_k}{\|\beta_k\|^2}\right)\beta_k,$$

where $\beta_k$ is the basis vector of the $k^{th}$ BS-BS CLI source $J_k = Q_k v_k$, where $Q_k$ is the wireless channel between NE 420 and NE 430; and $v_k$ is the precoder of the DL user transmitting on the corresponding sub-band.

Figure 7:
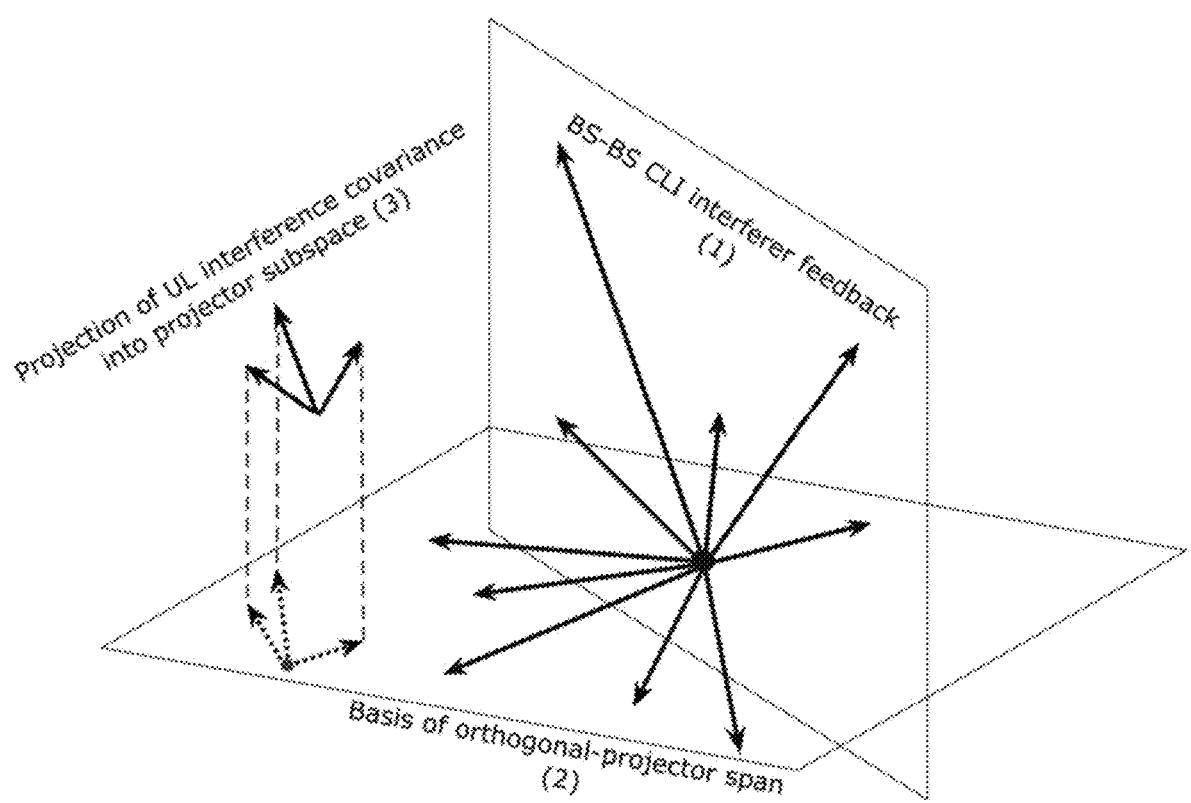
FIG. 7 illustrates an example of three-step BS-BS CLI suppression according to certain embodiments.
Figure 8:
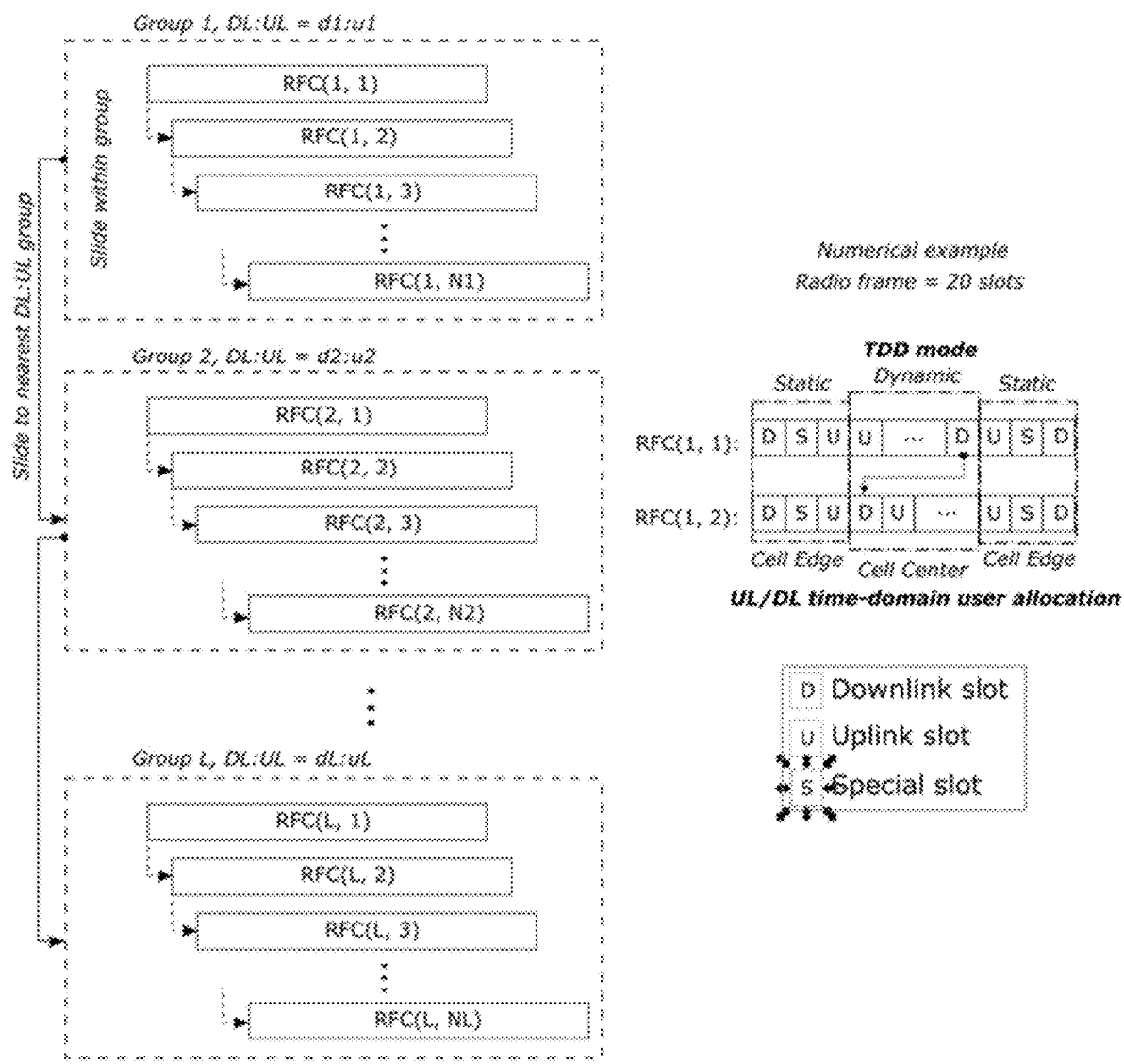
FIG. 8 illustrates an example of a RFC book and hybrid frame design for TTI=7 OFDM symbols according to certain embodiments.

In step 409, NE 430 may estimate at least one orthogonal projector span to the basis of the strongest BS-BS CLI interference according to:

$$A = [\beta_1, \beta_2, \ldots, \beta_k]^T$$

$$A_\perp = A(A^\perp A)^{-1} A^T,$$

where A and $A^\perp$ denote the BS-BS CLI sub-space and its orthogonal projector span, as illustrated in FIG. 7.

In step 411, for each reception associated with NE 430, NE 430 may spatially project at least one interference rejection combining (IRC) estimated interference covariance matrix into at least one orthogonal projector sub-space, according to:

$$\tilde{w}_{(:,i)} = \left(\frac{w_{(:,i)} \cdot A^\perp_{(:,i)}}{\|A^\perp_{(:,i)}\|^2}\right) \cdot A^\perp_{(:,i)},$$

where W and $\check{W}$ are the IRC estimated interference covariance matrix and the corresponding covariance matrix projected over the estimated projector sub-space, respectively.

In step 413, NE 430 may calculate at least one standard IRC decoding matrix u according to the at least one IRC estimated interference covariance matrix, according to:

$$u = (Hv(hv)^H + \tilde{w})^{-1} Hv,$$

where H is the intended wireless channel, and v is the intended precoder of the respective user.

Figure 5:
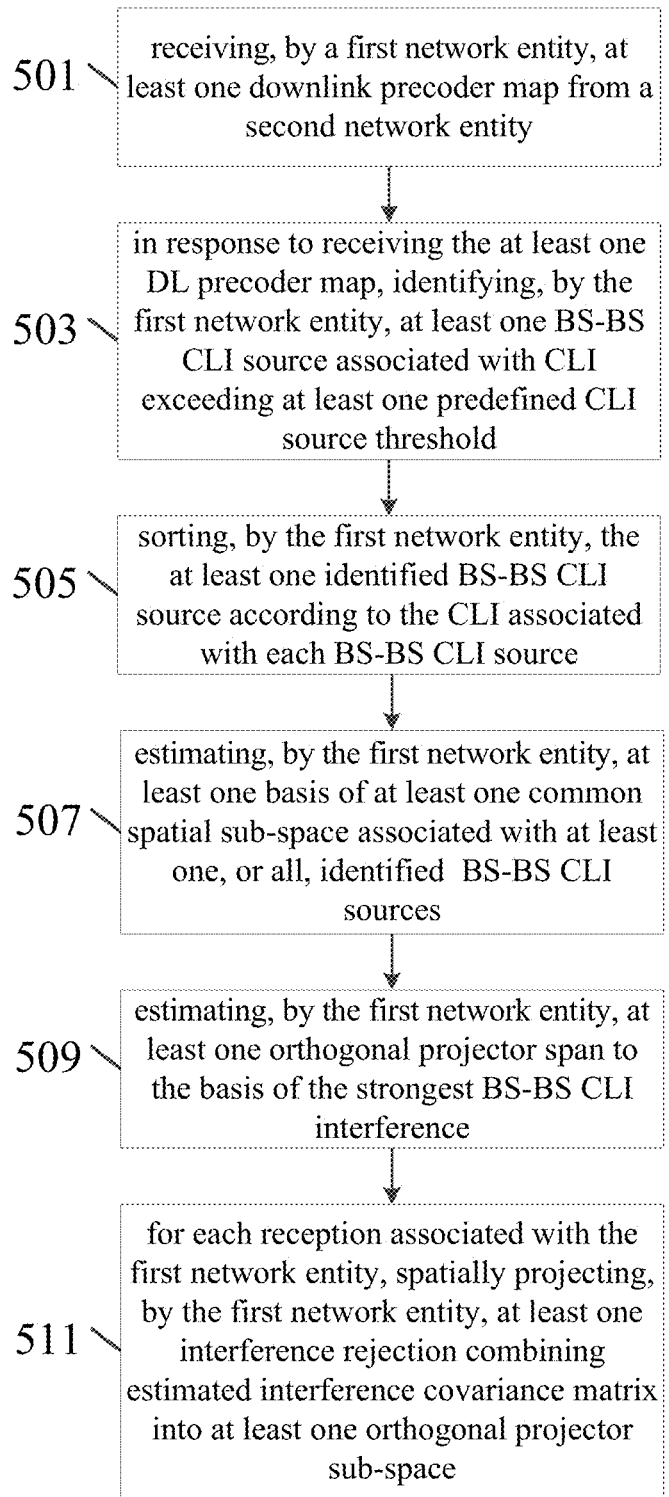
FIG. 5 illustrates an example of a method according to certain embodiments.

FIG. 5 illustrates an example of a method performed by a NE, such as NE 1610 illustrated in FIG. 16, according to certain embodiments. In step 501, the NE may receive at least one downlink precoder map from a neighbor NE, which may also be similar to NE 1610 in FIG. 16. The NE and/or the neighbor NE may be associated with at least one BS-BS CLI symbol/slot within at least one current RFC and/or may be adjacent base stations. Additionally, the NE may be in a DL mode and/or the neighbor NE may be in an uplink mode. The at least one DL precoder map may be transmitted over at least one $X_n$ interface. In some embodiments, the at least one DL precoder map may comprise at least one vector of bits configured to indicate at least one selected sub-band/wideband pre-coding matrix index (PMI) associated with at least one schedule DL user over the associated slot. The at least one selected sub-band/wideband PMI may be configured to be used by at least one scheduled user during a next DL symbol of the DL base stations, as illustrated in FIG. 6(*a*).

In some embodiments, the NE may be similar to a centralized unit (CU) and/or the neighbor NE may be similar to a distributed unit (DU). Thus, the NE may transmit the at least one downlink precoder map to the neighbor NE over at least one $X_n$-C interface configured to coordinate at least one $X_n$AP procedure, as defined in 3GPP TS 38.423, herein incorporated in its entirety, and/or an NG interface towards at least one 5G core network (5GC). The 5G NR architecture may be configured to allow C-RAN implementation associated with at least one CU and/or at least one DU. The CU-DU configuration may be associated with at least one E1 interface between at least one control plane and at least one user plane in the CU, as described in 3GPP TS 38.460 and/or TS 38.463, herein incorporated in their entirety. Additionally or alternatively, the CU-DU configuration may be associated with at least one F1 interface between at least one CU and at least one DU, as described in 3GPP TS 38.470 and/or TS 38.473, herein incorporated in their entirety.

In some embodiments, where the NE is, or is similar to, a UE, such as UE 1620 in FIG. 16, the NE may directly communicate with other UE, such as UE 1620 in FIG. 16, or with assistance from a network. For example, the NE may act as a relay UE, serving as a UL BS for at least one adjacent UE. In certain embodiments, the at least one adjacent UE may be affected by adjacent DL transmissions from neighboring base stations, as illustrated in FIG. 6(b). Thus, downlink precoder signaling may be performed over at least one radio interface from the neighbor NE to the NE.

In various embodiments, the at least one CU may be configured to serve as a master and/or the at least one DU may be configured to serve as a slave, as illustrated in FIG. 10. The at least one downlink precoder map may be transmitted according to at least one F1 control plane signaling path, such as F1-C. In response, the at least one CU may determine at least one RFC associated with the at least one DU, and transmit the at least one determined RCC to the at least one DU. The CU may be configured to identify at least one slot/symbol associated with DU-DU CLI.

For each instance of DU-DU CLI, the CU may transmit at least one request to at least one interfering DU to report at least one used precoder map. In response, the CU may forward the at least one reported used precoder map to at least one interfered DU. The at least one interfered DU may, according to the received at least one used precoder map, adjust at least one parameter to reduce DU-DU CLI interference.

In some embodiments, the CU may coordinate with at least one DU to perform at least one DU-DU radio channel measurement associated with low-offered traffic and/or conditions exceeding at least one interference threshold associated with at least one channel estimation task.

In step 503, in response to receiving the at least one DL precoder map, the NE may identify at least one BS-BS CLI source associated with CLI exceeding at least one predefined CLI source threshold. The at least one identified BS-BS CLI source may be scaled by at least one channel between at least one DL and at least one UL NE. In some embodiments, the at least one channel may be estimated according to at least one periodicity, which may be associated with at least one static property exceeding at least one predefined static property threshold.

In step 505, the NE may sort the at least one identified BS-BS CLI source in an order, such as descending order or ascending order, according to the CLI associated with each BS-BS CLI source. In some embodiments, the NE may consider only the $M_r-1$ BS-BS CLI sources, where $M_r$ is a number of UE antennas.

In step 507, the NE may estimate at least one basis of at least one common spatial sub-space associated with at least one, or all, identified $N_t-1$ BS-BS CLI sources. For example, the NE may perform the estimation according to:

$$\beta_k = \begin{cases} J_1, k = 1 \\ J_k - \sum_{j=1}^{k-1} proj_{\beta_j}(J_k), 2 \leq k \leq N_t - 1 \end{cases}$$

$$proj_{\beta_k}(J_k) = \left(\frac{J_k \cdot \beta_k}{\|\beta_k\|^2}\right)\beta_k,$$

where $\beta_k$ is the basis vector of the $k^{th}$ BS-BS CLI source $J_k Q_k v_k$, where $Q_k$ is the wireless channel between the NE and the neighbour NE, and $v_k$ is the precoder of the DL user transmitting on the corresponding sub-band.

In step 509, the NE may estimate at least one orthogonal projector span to the basis of the strongest BS-BS CLI interference according to:

$$A=[\beta_1,\beta_2,\ldots,\beta_k]^T$$

$$A^\perp = A(A^\perp A)^{-1}A^T,$$

where A and $A^\perp$ denote the BS-BS CLI sub-space and its orthogonal projector span, as illustrated in FIG. 7.

In step 511, for each reception associated with the NE, the NE may spatially project at least one interference rejection combining (IRC) estimated interference covariance matrix into at least one orthogonal projector sub-space, according to:

$$\tilde{w}_{(:,i)} = \left(\frac{w_{(:,i)} \cdot A^\perp_{(:,i)}}{\|A^\perp_{(:,i)}\|^2}\right) \cdot A^\perp_{(:,i)},$$

where W and $\tilde{W}$ are the IRC estimated interference covariance matrix and the corresponding covariance matrix projected over the estimated projector sub-space, respectively.

In step 513, the NE may calculate at least one standard IRC decoding matrix u according to the at least one IRC estimated interference covariance matrix, according to:

$$u=(Hv(Hv)^H+\tilde{w})^-Hv,$$

where H is the intended wireless channel, and v is the intended precoder of the respective user.

Some embodiments described herein may be associated with particular signaling overhead. For example, in a system with 10 MHz bandwidth, 50 physical resource blocks (PRBs), sub-band feedback, each of 8 PRBs, and 4-bit PMI feedback based on the 4-antenna port transmissions may be associated with 3 BS-BS CLI slots. The overall signalling overhead of the DL precoder map associated with each radio frame duration, such as 10 ms, may be determined as:

$$Xn\text{-interface signalling overhead} = 3 \times \left(\left(\frac{50}{8}\right) \times \left(\log_2\left(\frac{50}{8}\right) + 4\right)\right) =$$

124 bits per each 10 ms (i.e., radio frame duration).

Such signalling may not be required between every DL and UL BS pair since some DL NEs may not contribute severe BS-BS CLI to adjacent UL BSs due to a weak channel in between, which may be due to a large distance, obstruction, advanced beamforming, etc., and may lead to a further reduction in signalling overhead.

As discussed above, various embodiments described herein may provide certain advantages using at least one parameter shown in the table of FIG. 9. For example, within each cell, there may be K average number of active users. URLLC traffic may be characterized by at least one FTP3 traffic model, a finite Z-bit packet size per user, and/or a Poisson point arrival process $\lambda$. Thus, the aggregate offered DL and UL loads per cell in bits/sec may be given as $K \times \lambda_{\{DL,UL\}} \times Z$. The system bandwidth may be 10 MHz with 8 antennas at the BS and 2 antennas at the user equipment. Various coordination schemes described herein may be tested over various offered traffic loads of DL-heavy traffic ratio, which may correspond with strong DL-to-UL CLI.

Figure 11A:
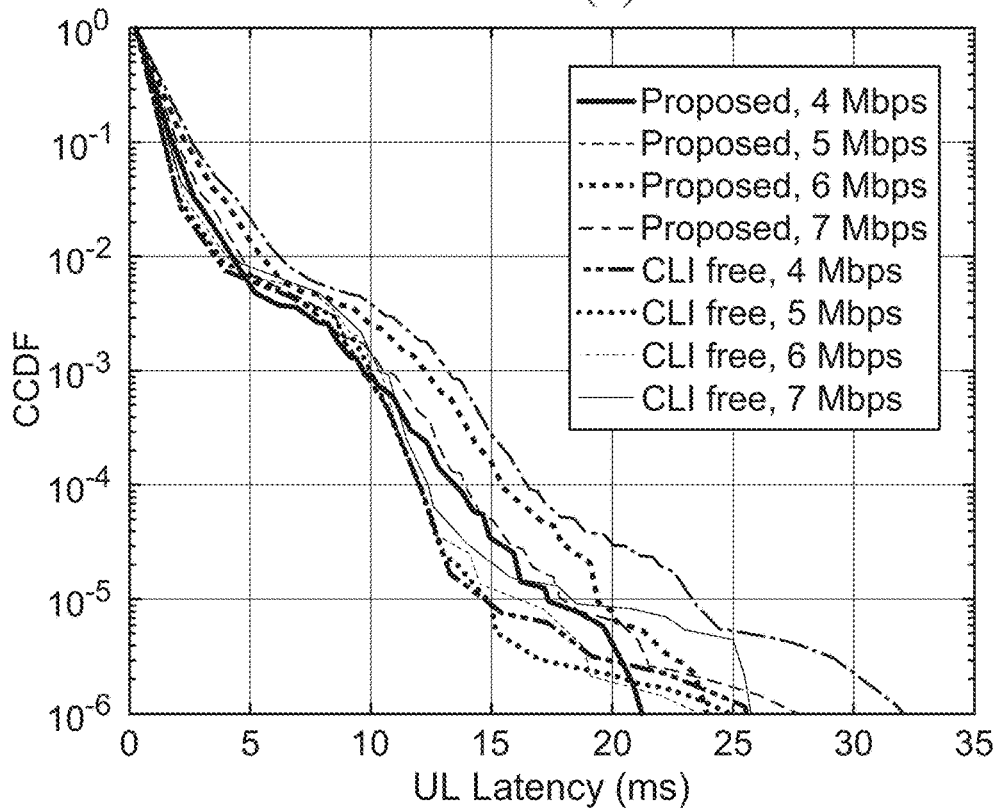
FIGS. 11(a) and 11(b) illustrate an example of UL and DL URLLC outage latency performance according to certain embodiments.
Figure 11B:
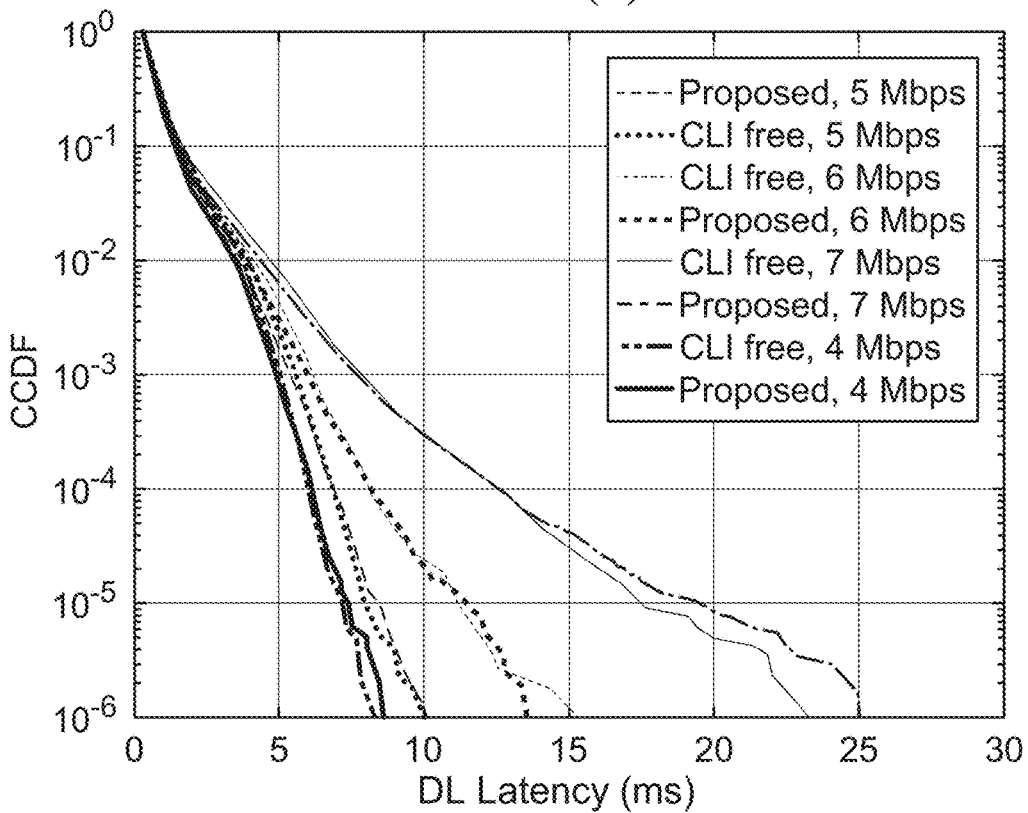

FIGS. 11(a) and 11(b) depict the complementary cumulative distribution function (CCDF) of the UL and DL URLLC latency in ms for different offered load levels with DL:UL=2:1 in various embodiments, with an optimal CLI-free case. Various embodiments may provide an optimal CLI-free over all outage probabilities including the URLLC outage probability at $10^{-5}$. At such an outage probability, various embodiments may offer only +4 ms than the optimal CLI-free case for an extreme offered load of 7 Mbps, but with a significantly lower coordination overhead and only over the Xn-interface.

FIG. 12 provides the full numerical results of the URLLC latency at $10^{-5}$ outage probability according to various embodiments described herein. Specifically, the NC and H-RFC schemes may suffer from extreme outage latency degradation due to the strong BS-BS CLI. Various embodiments may cause the UL packets to reach the maximum number of allowable retransmissions before being dropped, which may result in a significant loss of URLLC reliability. Various embodiments may provide an optimal CLI-free case with a consistent URLLC latency due to the absolute absence of the BS-BS and UE-UE CLI. However, certain embodiments may provide a similar outage latency performance as the optimal CLI-free case but with reduced signalling overhead space. As a result, various embodiments provide support for more offered loads to reach the same outage latency, such as from 4 Mbps to 7 Mbps.

Figure 13:
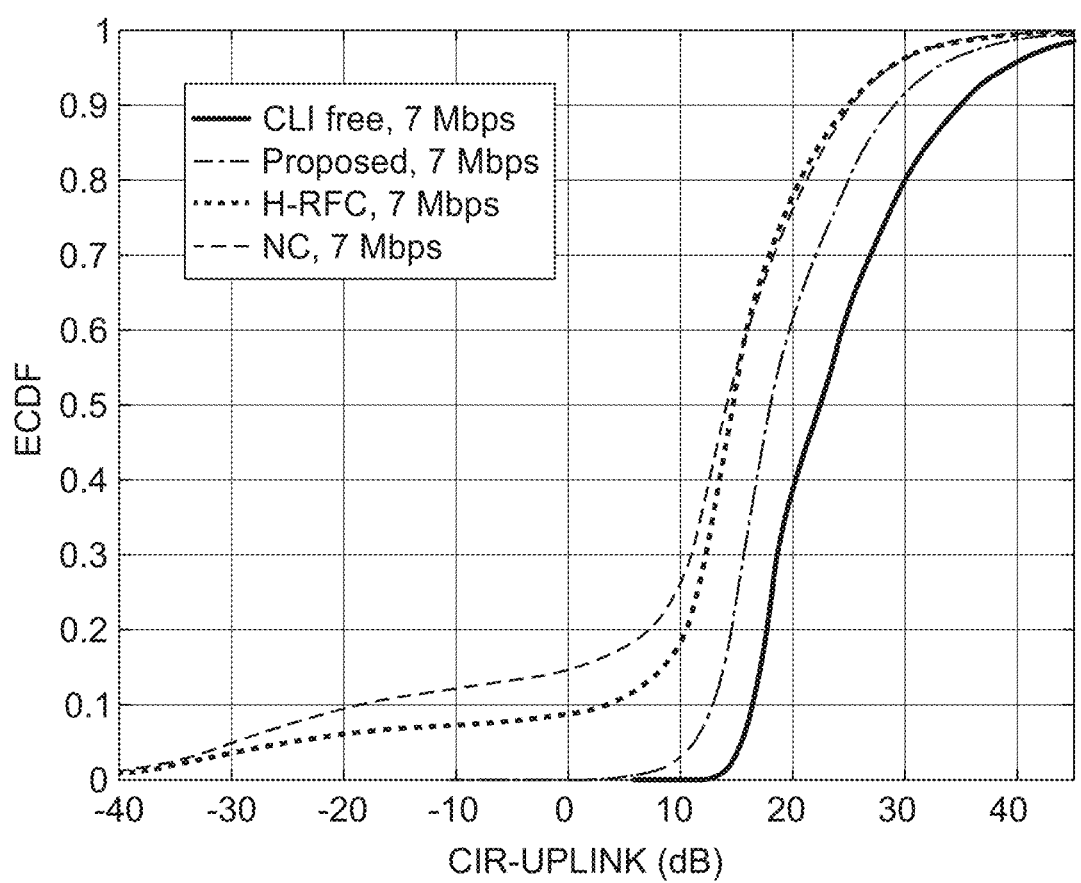
FIG. 13 illustrates an example of carrier-to-interference ratio performances in dB according to certain embodiments.
Figure 14:
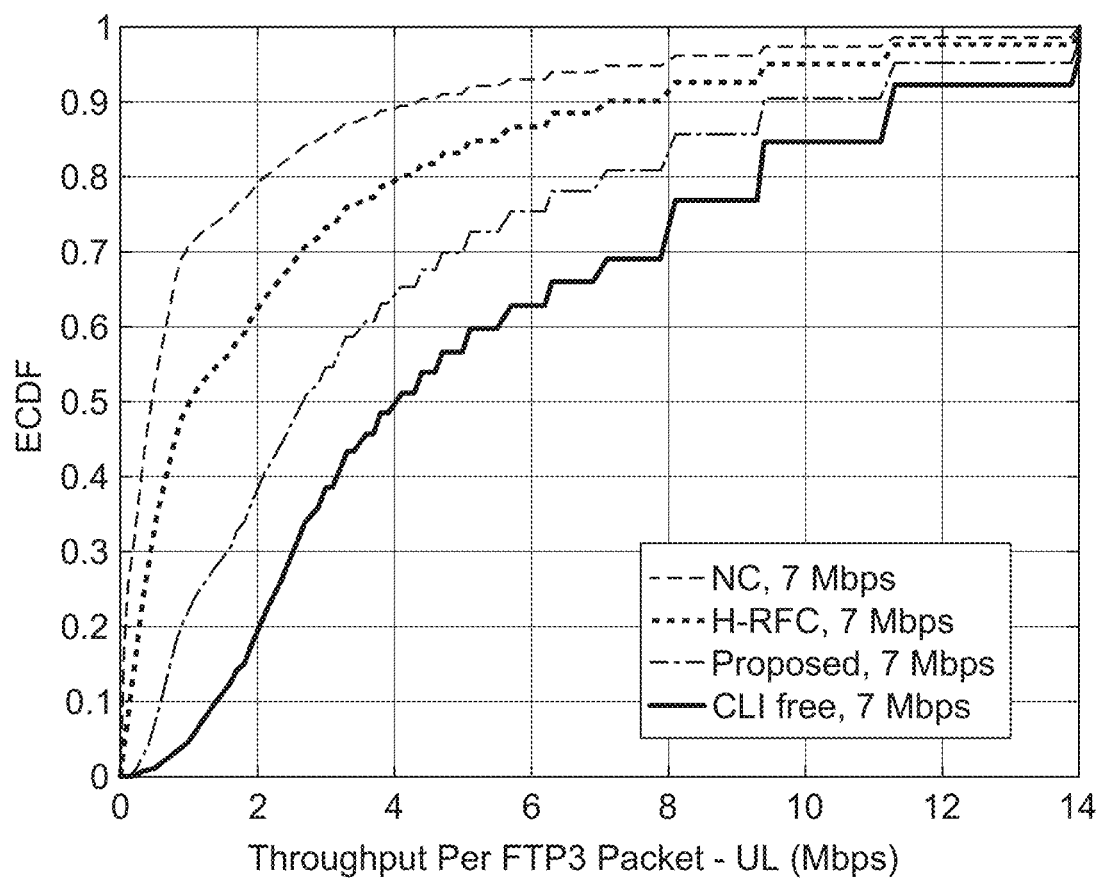
FIG. 14 illustrates an example of throughput per packet performance in Mbps according to certain embodiments.

FIG. 13 presents the empirical CDF (ECDF) of the carrier-to-interference ratio (CIR) in dB. Various embodiments may provide an increase of 3.5 dB in the CIR compared with NC and H-RFC, approaching the optimal CLI-free case due to the efficient BS-BS CLI suppression. FIG. 14 similarly illustrates an average throughput per packets in Mbps, where certain embodiments may provide an average of 3× fold throughput per URLLC packet, compared to H-RFC and NC.

Figure 15:
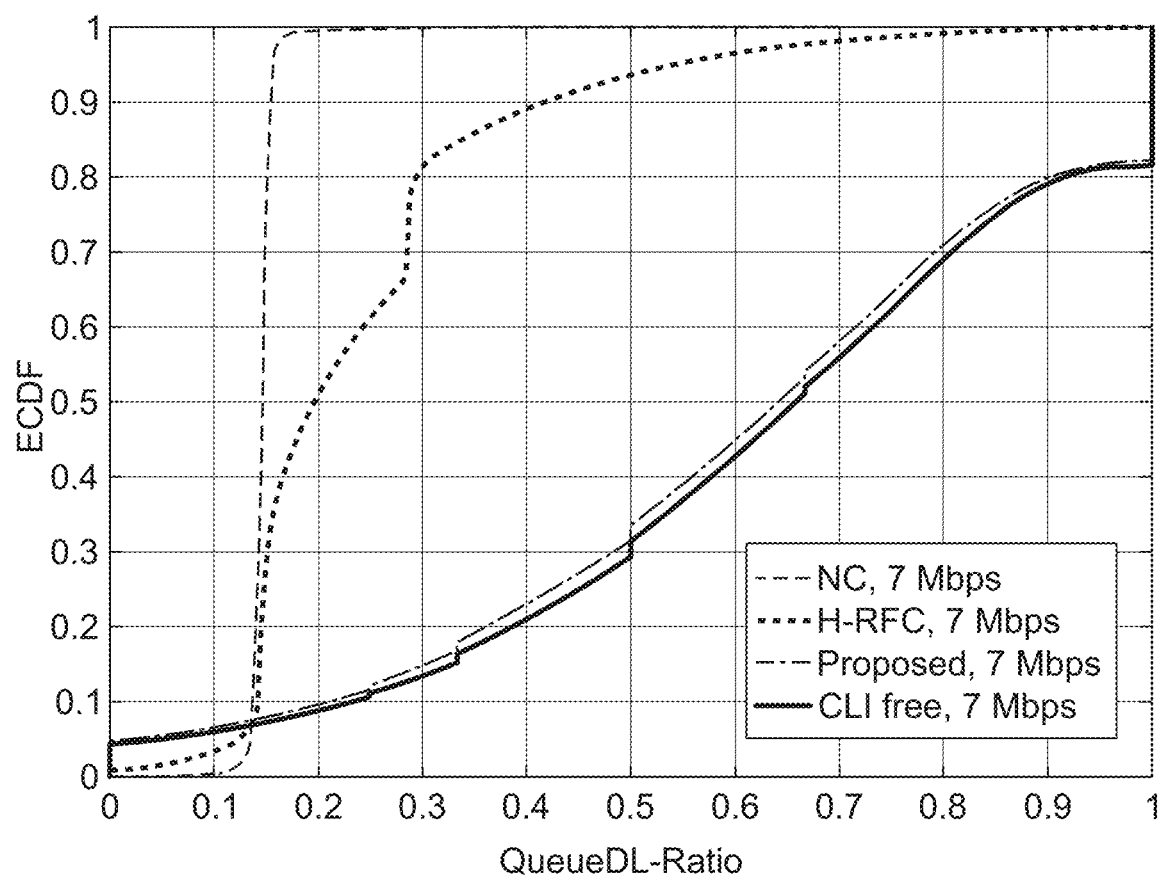
FIG. 15 illustrates an example of buffered traffic ratio performance according to certain embodiments.

FIG. 15 illustrates a queue traffic ratio, as described above. As shown in FIG. 14, certain embodiments may provide a queue ratio where roughly twice the DL traffic may be buffered in comparison to UL traffic, wherein the offered DL traffic may be twice the UL traffic. As a result, UL traffic may be successfully and quickly decoded without being buffered for several retransmission attempts. Various embodiments may also provide an optimal CLI-free case.

FIG. 16 illustrates an example of a system according to certain embodiments. In one embodiment, a system may include multiple devices, such as, for example, network entity 1610 and/or user equipment 1620.

Network entity 1610 may be one or more of: a base station, such as an evolved node B (eNB) or 5G or New Radio node B (gNB), a serving gateway, a server, and/or any other access node or combination thereof Network entity 1610 may also be a UE 1620 or be similar to UE 1620.

User equipment 1620 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

In addition, in some embodiments, functionality of the network entity 1610 and/or UE 1620 may be implemented by other network nodes, such as a wireless relay node. For example, functionalities of NE 1610 may be performed by a mobile termination (MT) component of the IAB node. Furthermore, network entity 1610 and/or user equipment 1620 may be one or more of a citizens broadband radio service device (CBSD).

One or more of these devices may include at least one processor, respectively indicated as 1611 and 1621. Processors 1611 and 1621 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 1612 and 1622. The memory may be fixed or removable. The memory may include computer program instructions or computer code contained therein. Memories 1612 and 1622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 1611 and 1621 and memories 1612 and 1622 or a subset thereof, may be configured to provide means corresponding to the various blocks of FIGS. 1-15. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 16, transceivers 1613 and 1623 may be provided, and one or more devices may also include at least one antenna, respectively illustrated as 1614 and 1624. The device may have many antennas, such as an array of antennas configured for multiple input multiple output (MIMO) communications, or multiple antennas for multiple radio access technologies. Other configurations of these devices, for example, may be provided. Transceivers 1613 and 1623 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-15). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-15. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 17:
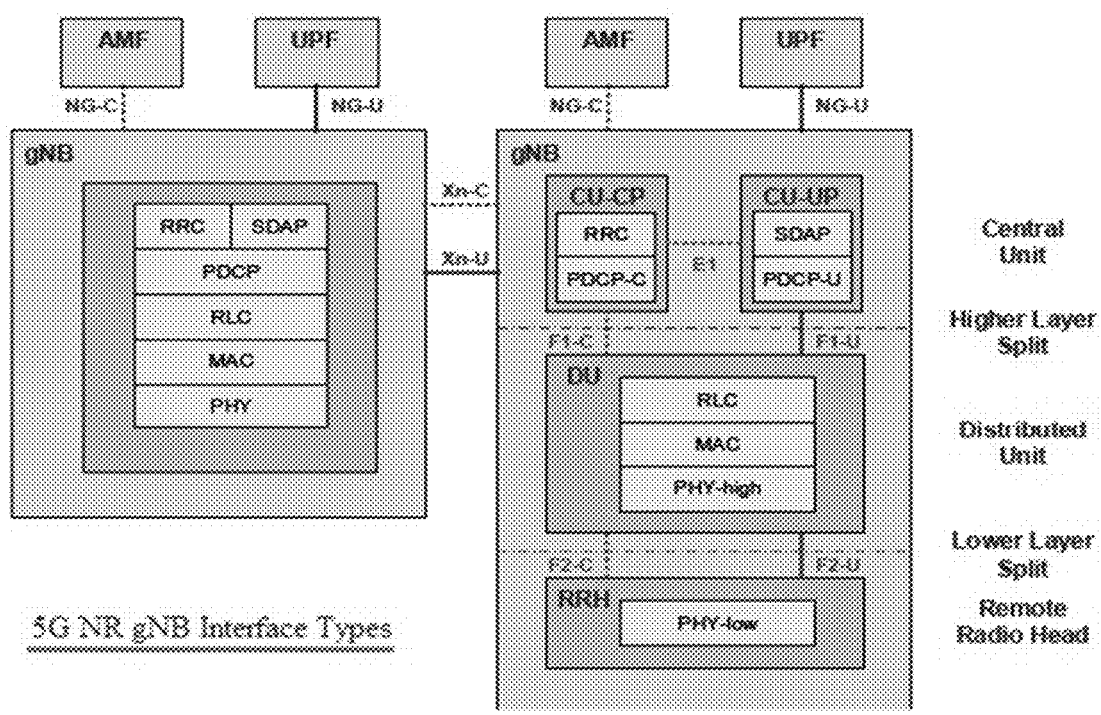
FIG. 17 illustrates an architecture according to certain embodiments.
Figure 18:
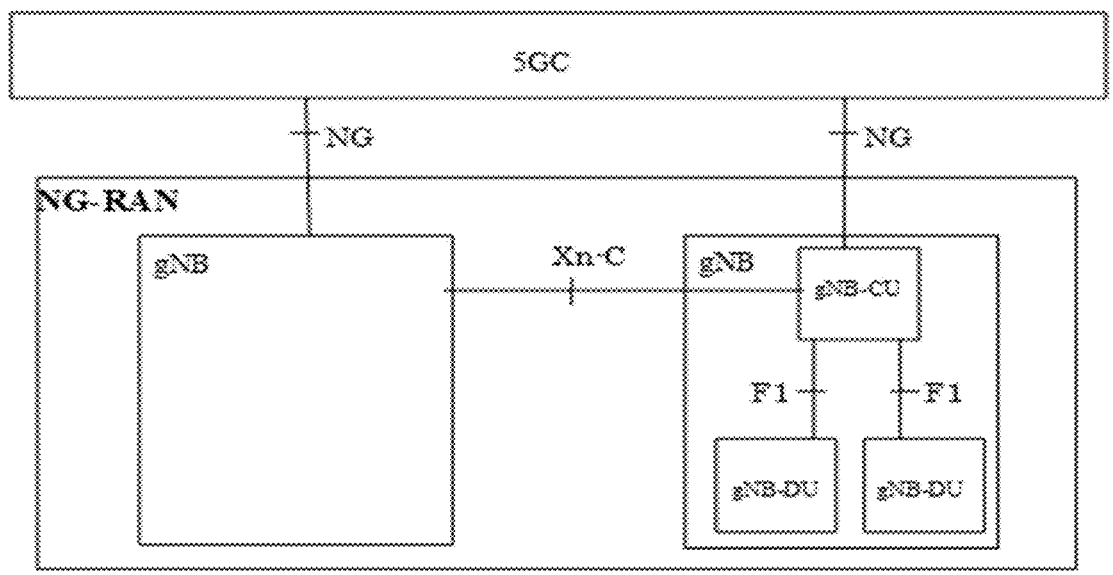
FIG. 18 illustrates another architecture according to certain embodiments.

FIG. 17 illustrates an architecture according to certain embodiments. FIG. 18 illustrates another architecture according to certain embodiments.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary
3GPP 3rd Generation Partnership Project
5G 5th Generation
BS Base Station
CLI Cross Link Interference
CLI-free CLI-free Dynamic TDD
CQI Channel Quality Indicator
CU Centralized Unit
DL Downlink
DSS Dynamic Slot Set
DU Distributed Unit
ECDF Empirical Cumulative Distribution Function
eMBB Enhanced Mobile Broadband
eNB Evolved Node B
EPC Evolved Packet Core
FDD Frequency Division Multiplexing
gNB New Radio Node B
GPS Global Positioning System
H-RFC Hybrid RFC Dynamic TDD
IRC Interference Rejection Combining
LTE Long-Term Evolution
MAC Medium Access Control
MCS Modulation and Coding Scheme
MME Mobility Management Entity
MTC Machine-Type Communications
NC Non-Coordinated Dynamic TDD
NG-eNB Next Generation Evolved Node-B
NR New Radio
OAM Operation, Administration, and Management
OFDM Orthogonal Frequency Division Multiplexing
PDU Protocol Data Unit
PRB Physical Resource Block
QoS Quality of Service
RAN Radio Access Network
RFC Radio Frame Configuration
RFCB Radio Frame Configuration Book
RLC Radio Link Control
SB Sub-Band
SN Sequence Number
SSS Static Slot Set
TCP Transmission Control Protocol
TDD Time Division Duplexing
TTI Transmission Time Interval
UE User Equipment
UL Uplink
URLLC Ultra-Reliable and Low-Latency Communication

We claim:

1. A method, comprising:
receiving, by a first network entity, at least one downlink precoder map from a second network entity over at least one interface;
estimating, by the first network entity, at least one basis of at least one common spatial sub-space associated with at least one identified cross-link interference source; and
for each reception associated with the first network entity, spatially projecting, by the first network entity, at least one interference rejection combining estimated interference covariance matrix into at least one orthogonal projector sub-space.

2. The method of claim 1, further comprising:
in response to receiving the at least one downlink precoder map, identifying, by the first network entity, at least one between base stations cross-link interference source associated with cross-link interference exceeding at least one predefined cross-link interference source threshold.

3. The method of claim 1, further comprising:
sorting, by the first network entity, the at least one identified between base stations cross-link interference source according to the CLI cross-link interference associated with each between base stations cross-link interference source.

4. The method of claim 1, further comprising:
estimating, by the first network entity, at least one orthogonal projector span to the basis of the strongest between base stations cross-link interference.

5. The method of claim 1, wherein the interface is an $X_n$ interface, $X_n$-C interface, F1 interface, F1-C interface, or radio interface.

6. The method of claim 1, wherein the at least one common spatial sub-space is associated with at least one identified between base stations cross-link interference source.

7. The method of claim 1, wherein the first network entity is a user equipment or a base station.

8. The method of claim 1, wherein the first network entity is in a downlink mode, and the second network entity is in an uplink mode.

9. The method of claim 1, wherein the first network entity is a centralized unit and the second network entity is a distributed unit.

10. The method of claim 9, wherein the at least one centralized unit is configured to serve as a master, and the at least one distributed unit is configured to serve as a slave.

11. The method of claim 1, wherein the at least one common spatial sub-space is associated with at least one identified between distributed unit cross-link interference source.

12. The method of claim 1, wherein the at least one downlink precoder map comprises at least one vector of bits configured to indicate at least one selected sub-band/wideband pre-coding matrix index associated with at least one schedule downlink user over the associated slot.

13. The method of claim 1, wherein the at least one selected sub-band/wideband pre-coding matrix index is configured to be used by at least one scheduled user during a next downlink symbol of the downlink base stations.

14. The method of claim 1, wherein the at least one identified between base stations cross-link interference source is scaled by at least one channel between at least one downlink and at least one uplink network entity.

15. The method of claim 1, wherein the estimating is based on $M_r-1$ between base stations cross-link interference sources, where $M_r$ is a number of mouser equipment antennas.

16. An apparatus, comprising:
at least one processor; and
at least one memory including computer program code,
wherein the at least one memory and the computer program code are configured to, with the at least one processor, cause the apparatus to:
receive at least one downlink precoder map from a network entity over at least one interface;
estimate at least one basis of at least one common spatial sub-space associated with at least one identified stations cross-link interference source; and
for each reception associated with the apparatus, spatially project at least one interference rejection combining estimated interference covariance matrix into at least one orthogonal projector sub-space.

17. The apparatus of claim 16, wherein the apparatus is further configured to:
in response to receiving the at least one downlink precoder map, identify at least one between base stations cross-link interference source associated with cross-link interference exceeding at least one predefined cross-link interference source threshold.

18. The apparatus of claim 16, wherein the apparatus is further configured to:
sort the at least one identified between base stations cross-link interference source according to the cross-link interference associated with each between base stations cross-link interference source.

19. The apparatus of claim 16, wherein the apparatus is further configured to:
estimate at least one orthogonal projector span to the basis of the strongest between base stations cross-link interference.

20. The apparatus of claim 16, wherein the interface is an $X_n$ interface, $X_n$-C interface, F1 interface, F1-C interface, or radio interface.

21. The apparatus of claim 16, wherein the at least one common spatial sub-space is associated with at least one identified between base stations cross-link interference source.

22. The apparatus of claim 16, wherein the apparatus is a user equipment or a base station.

23. The apparatus of claim 16, wherein the apparatus is in a downlink mode, and the network entity is in an uplink mode.

24. The apparatus of claim 16, wherein the apparatus is a centralized unit and the network entity is a distributed unit.

25. The apparatus of claim 24, wherein the at least one centralized unit is configured to serve as a master, and the at least one distributed unit is configured to serve as a slave.

26. The apparatus of claim 16, wherein the at least one common spatial sub-space is associated with at least one identified between distributed unit cross-link interference source.

27. The apparatus of claim 16, wherein the at least one downlink precoder map comprises at least one vector of bits configured to indicate at least one selected sub-band/wideband pre-coding matrix index associated with at least one schedule downlink user over the associated slot.

28. The apparatus of claim 16, wherein the at least one selected sub-band/wideband pre-coding matrix index is configured to be used by at least one scheduled user during a next downlink symbol of the downlink base stations.

29. The apparatus of claim 16, wherein the at least one identified between base stations cross-link interference source is scaled by at least one channel between at least one downlink and at least one uplink network entity.

30. The apparatus of claim 16, wherein the estimating is based on $M_r-1$ between base stations cross-link interference sources, where $M_r$ is a number of mouser equipment antennas.

* * * * *